United States Patent
Hsu et al.

(10) Patent No.: US 11,496,715 B2
(45) Date of Patent: Nov. 8, 2022

(54) IMAGE COLOR BRIGHTNESS COMPENSATION METHOD AND IMAGE COLOR BRIGHTNESS COMPENSATION SYSTEM BY USING A BAYER COLOR FILTER AND A DEMOSAIC PROCESS

(71) Applicant: WELTREND SEMICONDUCTOR INC., Hsinchu (TW)

(72) Inventors: Te-Wei Hsu, Hsinchu (TW); Hsuan-Ying Chen, Hsinchu (TW); Chien-Ming Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 17/507,786

(22) Filed: Oct. 21, 2021

(65) Prior Publication Data
US 2022/0286651 A1    Sep. 8, 2022

(30) Foreign Application Priority Data
Mar. 8, 2021    (TW) .................................. 110108141

(51) Int. Cl.
| H04N 9/04 | (2006.01) |
| G06T 5/50 | (2006.01) |
| G06T 5/00 | (2006.01) |
| H04N 5/243 | (2006.01) |
| G06T 3/40 | (2006.01) |

(52) U.S. Cl.
CPC ....... *H04N 9/04515* (2018.08); *G06T 3/4015* (2013.01); *G06T 5/009* (2013.01); *G06T 5/50* (2013.01); *H04N 5/243* (2013.01)

(58) Field of Classification Search
None
See application file for complete search history.

(56) References Cited

U.S. PATENT DOCUMENTS

| 2006/0054783 A1* | 3/2006 | Voronov ................. H04N 5/243 348/E5.081 |
| 2009/0180001 A1 | 7/2009 | Machishima |
| 2015/0138366 A1 | 5/2015 | Keelan |
| 2018/0007333 A1* | 1/2018 | Lim ...................... G06T 3/4007 |
| 2018/0271412 A1* | 9/2018 | Shigeta .............. A61B 1/00009 |

* cited by examiner

*Primary Examiner* — James M Hannet
(74) *Attorney, Agent, or Firm* — Winston Hsu

(57) ABSTRACT

An image color brightness compensation method includes generating image data of a plurality of pixels by using a Bayer color filter of an image sensing unit, generating demosaic image data after the image data of the plurality of pixels is processed by a demosaic process, executing a linear combination process of the demosaic image data by using at least one matrix for generating output image data, processing the output image data by using a blending unit for generating blended image data, generating a brightness compensation gain of the blended image data, and compensating image brightness of the blending image data for generating brightness compensated image data according to the brightness compensation gain.

16 Claims, 2 Drawing Sheets

IMAGE COLOR BRIGHTNESS COMPENSATION METHOD AND IMAGE COLOR BRIGHTNESS COMPENSATION SYSTEM BY USING A BAYER COLOR FILTER AND A DEMOSAIC PROCESS

BACKGROUND OF THE INVENTION

1. Field of the Invention

The present invention illustrates an image color brightness compensation method and an image color brightness compensation system, and more particularly, an image color brightness compensation method and an image color brightness compensation system by using a Bayer Color filter and a demosaic process.

2. Description of the Prior Art

With the advancement of photography technologies, various photo sensors and image processing algorithms are adopted in recent years. For example, when a camera captures an image in a dark scene, the image may become an under-exposed image. Since a signal-to-noise ratio (SNR) of the under-exposed image is low, noise (i.e., thermal noise or granularity noise) becomes severe and may be randomly distributed in the under-exposed image. In order to provide satisfactory image quality in the dark scene, some new Bayer formats are proposed and applied to advanced photo sensors. As known in the art, a Bayer filter can be regarded as a color filter array (CFA) including a plurality of primary color (RGB) filters on square grids of photo sensors. However, in the new Bayer formats, a CFA can include 2×2 Bayer patterns, such as RYYB (red/yellow/yellow/blue) color filters. A purpose of introducing the new Bayer formats is to improve the SNR of a video or an image captured in the dark scene.

However, although the Bayer color filter can improve the signal-to-noise ratio of the captured image, when a light sensor has three primary colors (RGB) and infrared light (IR) detection capabilities, image resolutions or color fidelity may be sacrificed since an impact of the infrared light energy. In other words, after the light signal including the three primary colors (RGB) and infrared light (IR) detected by the light sensor is processed by the color filter array of the Bayer filter and a demosaic process, it is required to introduce a calibration process for correcting color offsets. However, the calibration process for correcting color offsets may introduce color compensation bias or image brightness distortion.

SUMMARY OF THE INVENTION

In an embodiment of the present invention, an image color brightness compensation method is disclosed. The image color brightness compensation method comprises generating image data of a plurality of pixels by using a Bayer color filter of an image sensing unit, generating demosaic image data after the image data of the plurality of pixels is processed by a demosaic process, executing a linear combination process of the demosaic image data by using at least one matrix for generating output image data, processing the output image data by using a blending unit for generating blended image data, generating a brightness compensation gain of the blended image data, and compensating image brightness of the blending image data for generating brightness compensated image data according to the brightness compensation gain. The image data of the plurality of pixels, the demosaic image data, the output image data, the blended image data, and the brightness compensated image data comprise red light data, green light data, blue light data, and infrared light data.

In another embodiment of the present invention, an image color brightness compensation system is disclosed. The image color brightness compensation system comprises an image sensing unit, an image processing unit, at least one matrix operation unit, a blending unit, and a brightness compensation unit. After the demosaic image data is generated, the at least one matrix operation unit executes a linear combination process of the demosaic image data by using at least one matrix for generating output image data. The blending unit processes the output image data for generating blended image data and a brightness compensation gain of the blended image data. The brightness compensation unit compensates image brightness of the blending image data for generating brightness compensated image data according to the brightness compensation gain. The image data of the plurality of pixels, the demosaic image data, the output image data, the blended image data, and the brightness compensated image data comprise red light data, green light data, blue light data, and infrared light data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
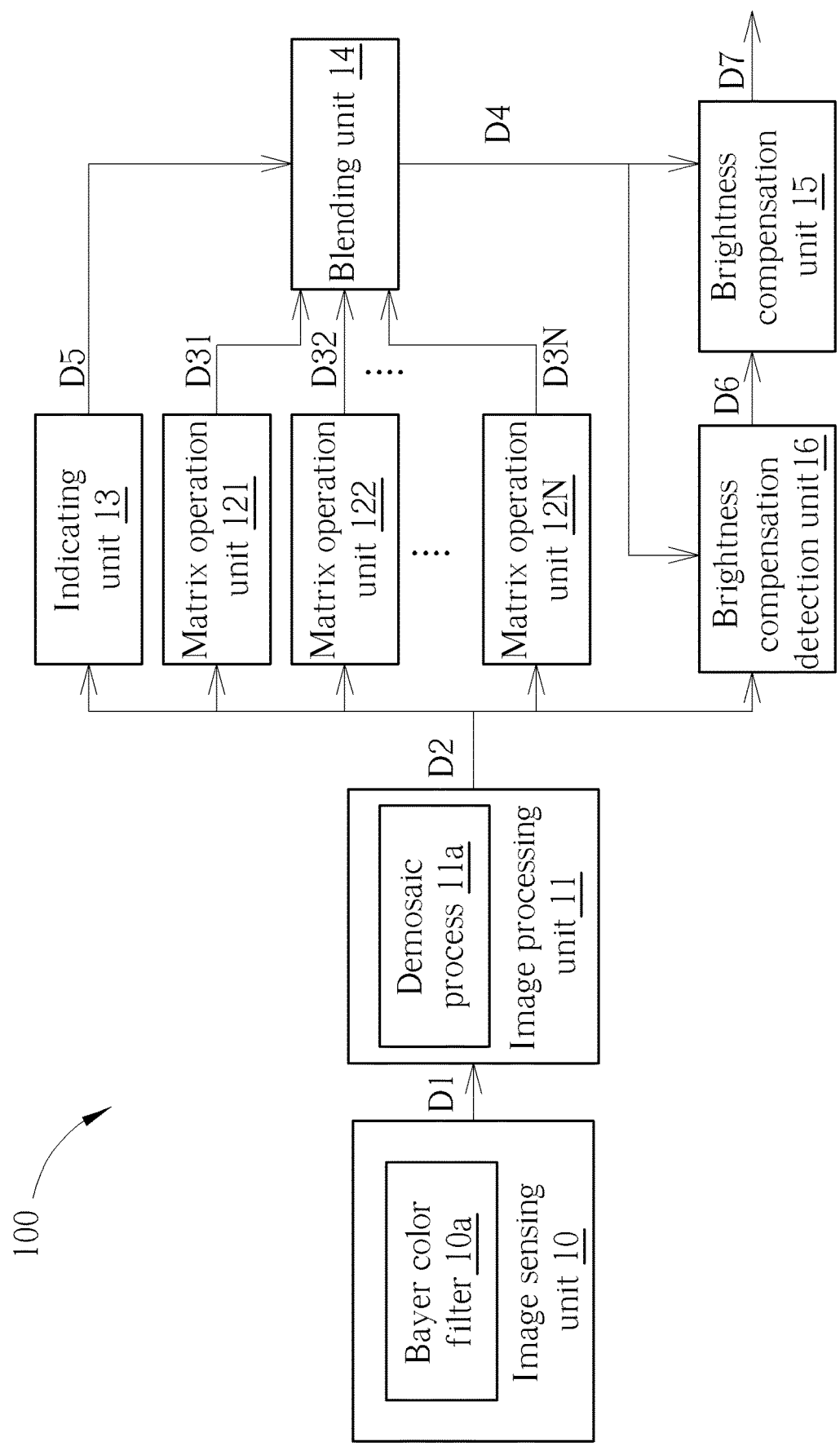
FIG. 1 is a block diagram of an image color brightness compensation system according to an embodiment of the present invention.

FIG. 1 is a block diagram of an image color brightness compensation system 100 according to an embodiment of the present invention. The image color brightness compensation system 100 includes an image sensing unit 10, an image processing unit 11, at least one matrix operation unit 121 to 12N, a blending unit 14, and a brightness compensation unit 15. The image sensing unit 10 has a Bayer color filter 10a for generating image data D1 of a plurality of pixels. The image sensing unit 10 may also include any light sensing device, such as a charge-coupled device (CCD) or a complementary metal-oxide-semiconductor (CMOS). The image processing unit 11 is coupled to the image sensing unit 10 for processing the image data D1 of the plurality of pixels by a demosaic process 11a to generate demosaic image data D2. Patterns of the Bayer color filter 10a can be integrated as a color filter array (CFA) stacked on the light sensing device. The color brightness compensation system 100 can use any reasonable patterns of the Bayer color filter 10a. The demosaic process 11a can be used for reconstructing a full-colored image from the image data D1 of the plurality of pixels outputted from the image sensing unit 10 by using the Bayer filter 10a. For example, the demosaic process 11a can use an interpolation technology for processing the image data D1 of the plurality of pixels for generating the full-colored image including full-colored resolutions of red light data, green light data, and blue light data. In other embodiments, the Bayer color filter 10a and the demosaic process 11a can be used for processing images with three primary colors and infrared light. At least one matrix operation unit is coupled to the image processing unit 11. In FIG. 1, at least one matrix operation unit can be represented as matrix operation unit 121 to matrix operation unit 12N. N is a positive integer. The matrix operation unit 121 to the matrix operation unit 12N can perform matrix operations. For example, they can perform square matrix operations. The blending unit 14 is coupled to at least one matrix operation unit (121 to 12N) for combining the output image data (i.e., such as output image data D31 to D3N) of the at least one matrix operation unit. The brightness compensation unit 15 is coupled to the blending unit 14. In the image color brightness compensation system 100, after the demosaic image data D2 is generated by the image processing unit 11, the at least one matrix operation unit 121 to 12N executes a linear combination process of the demosaic image data D2 by using at least one matrix for generating output image data D31 to D3N. The blending unit 14 processes the output image data D31 to D3N for generating blended image data D4. The brightness compensation detection unit 16 can generate a brightness compensation gain D6 of the blended image data D4. The brightness compensation unit 15 compensates image brightness of the blending image data D4 for generating brightness compensated image data D7 according to the brightness compensation gain D6. Further, in the image color brightness compensation system 100, the image data D1 of the plurality of pixels, the demosaic image data D2, the output image data D31 to D3N, the blended image data D4, and the brightness compensated image data D7 include red light data, green light data, blue light data, and infrared light data. Therefore, an image data format of image color brightness compensation system 100 can be represented as a 4×1 vector, such as [R G B IR]. R represents as a value of red light. G represents as a value of green light. B represents as a value of blue light. IR represents as a value of infrared light.

In the image color brightness compensation system 100, an indicating unit 13 can be introduced. The indicating unit 13 is coupled to the blending unit 14 and the image processing unit 11 for generating a weighting signal for controlling the blending unit 14 to execute a blending process of the output image data D31 to D3N. As previously mentioned, the at least one matrix operation unit 121 to 12N can execute the linear combination process of the demosaic image data D2 by using the at least one matrix for generating the output image data D31 to D3N. Then, the blending unit 14 can further execute a linear combination process to the output image data D31 to D3N for generating the blended image data D4 after the output image data D31 to D3N is generated by using the at least one matrix. For example, when N=2 is configured, the image color brightness compensation system 100 can use two matrices for generating the output image data D31 and D32 respectively. The blended image data D4 generated by the blended unit 14 can be expressed as follows:

$$D4=\alpha*D31+(1-\alpha)*D32$$

Here, $\alpha$ is denoted as a weighting. In other words, the blended image data D4 can be regarded as the output image data D31 combined with the output image data D32 according to a certain ratio. Further, the weighting signal D5 generated by the indicating unit 13 can be regarded as a signal having information of the weighting $\alpha$. The weighting signal D5 relates to an infrared light value, or relates to a maximum value of a red light value, a green light value, and a blue light value of the demosaic image data D2. For, example, when the weighting signal D5 is generated according to the infrared light value of the demosaic image data D2, it implies that the blended image data D4 outputted by the blending unit 14 corresponds to an image having strong infrared light contrast. When the weighting signal D5 is generated according to the maximum value of the red light value, the green light value, the blue light value, and the infrared light value, it implies that the blended image data D4 outputted by the blending unit 14 corresponds to an image with a conservative contrast of mixed light colors. Further, the weighting signal D5 can be generated by the indicating unit 13 by using a query table. Any reasonable technology or hardware modification falls into the scope of the present invention.

Further, as previously mentioned, the matrix operation units 121 to 12N can use at least one matrix for performing the linear combination process to the demosaic image data D2. Then, the output image data D31 and D3N can be generated accordingly. The at least one matrix can be designed according to the requirements of users for compensating colors in a specific brightness interval. For example, the at least one matrix can include a first matrix and a second matrix. After the demosaic image data D2 is generated by using the Bayer color filter 10a and the demosaic process 11a, the first matrix can be used for compensating colors of pixels in an intermediate brightness interval. The second matrix can be used for compensating colors of pixels in a high brightness interval or a low brightness interval. In other words, the matrix operation units 121 to 12N can be customized according to the requirements of users for outputting images having true colors. The image color brightness compensation system 100 can generate customized color images. Further, the image color brightness compensation system 100 can calibrate distorted brightness. Details are described below.

In the image color brightness compensation system 100, a brightness compensation detection unit 16 can be introduced. The brightness compensation detection unit 16 is coupled to the blending unit 14, the brightness compensation unit 15, and the image processing unit 11. In the image color brightness compensation system 100, a goal of "brightness compensation" is to adjust average brightness of pixels corresponding to the brightness compensated image data D7 substantially equal to average brightness of pixels corresponding to the demosaic image data D2. In other words, in the image color brightness compensation system 100, the brightness compensation gain can be used for compensating each pixel of the plurality of pixels. Therefore, brightness of each pixel corresponding to the demosaic image data D2 is substantially equal to brightness of each pixel corresponding to the brightness compensated image data D7. Therefore, the brightness compensation gain can be regarded as "pixel-based compensation gain". The brightness compensation gain can be used for compensating an image formed by the plurality of pixels. Therefore, average brightness of pixels corresponding to the demosaic image data D2 is substantially equal to average brightness of pixels corresponding to the brightness compensated image data D7. Therefore, the brightness compensation gain can be regarded as "frame-based compensation gain". In the image color brightness compensation system 100, the brightness compensation detection unit 16 can be used for detecting first brightness corresponding to the demosaic image data D2 and detecting second brightness corresponding to the blended image data D4. Then, the brightness compensation detection unit 16 can generate the pixel-based compensation gain or the frame-based compensation gain of the blended image data D4. The pixel-based compensation gain and the frame-based compensation gain can be denoted as the brightness compensation gain D6. After the brightness compensation unit 15 receives information of the brightness compensation gain D6, the brightness compensation unit 15 can adjust pixel-based brightness or frame-based brightness of the blended image data D4. For example, the pixel-based brightness or frame-based brightness of the blended image data D4 can be reduced or enhanced by the brightness compensation unit 15 according to the brightness compensation gain D6. Therefore, a displayed image of the brightness compensated image data D7 can represent true colors.

Figure 2:
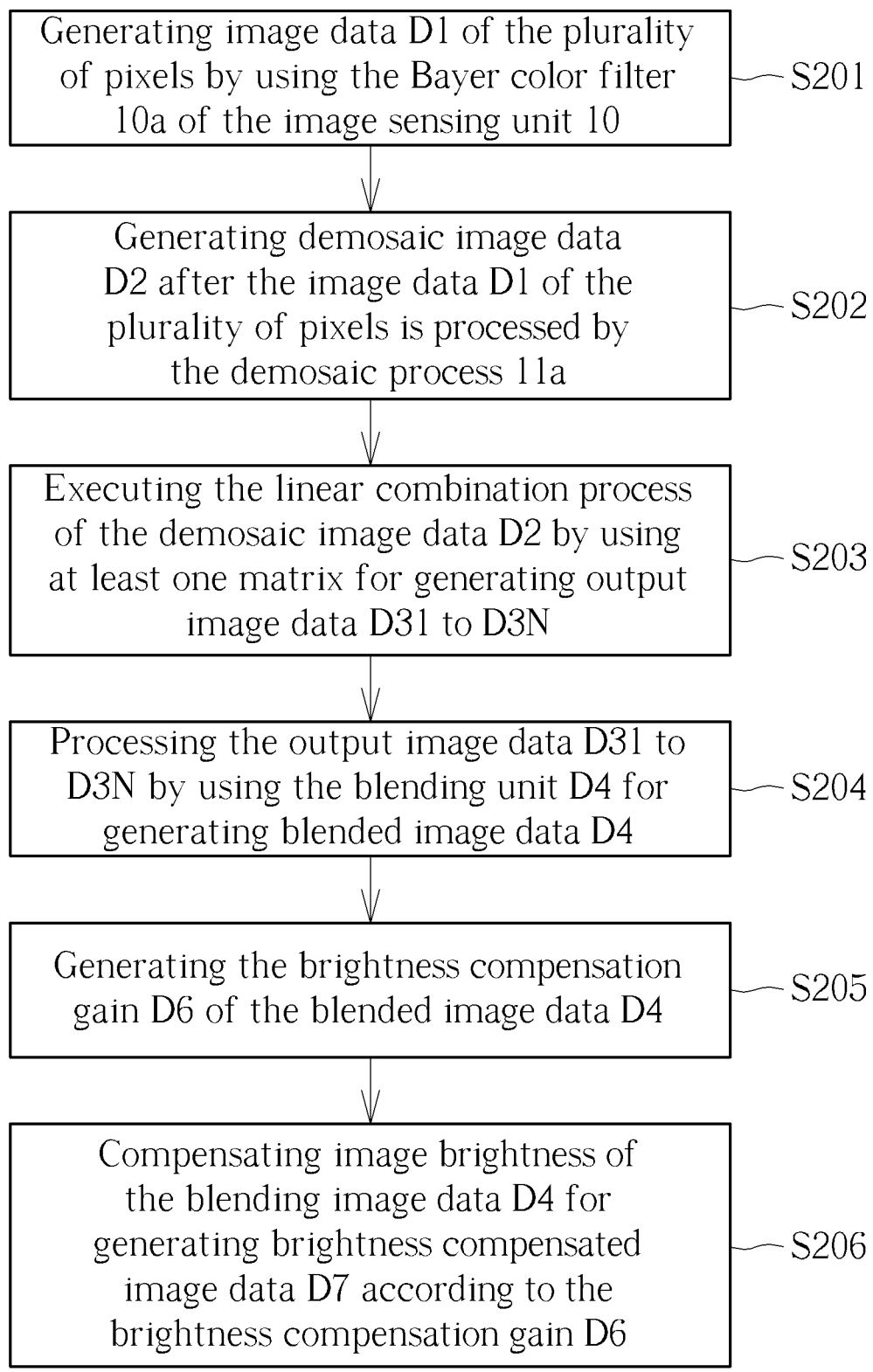
FIG. 2 is a flowchart performing the image color brightness compensation method by the image color brightness compensation system in FIG. 1.

FIG. 2 is a flowchart performing the image color brightness compensation method by the image color brightness compensation system 100. The image color brightness compensation method includes step S201 to step S206. Any reasonable hardware or technology modification falls into the scope of the present invention. Step S201 to step S206 are illustrated below.

step S201: generating image data D1 of the plurality of pixels by using the Bayer color filter 10a of the image sensing unit 10;

step S202: generating demosaic image data D2 after the image data D1 of the plurality of pixels is processed by the demosaic process 11a;

step S203: executing the linear combination process of the demosaic image data D2 by using at least one matrix for generating output image data D31 to D3N;

step S204: processing the output image data D31 to D3N by using the blending unit D4 for generating blended image data D4;

step S205: generating the brightness compensation gain D6 of the blended image data D4;

step S206: compensating image brightness of the blending image data D4 for generating brightness compensated image data D7 according to the brightness compensation gain D6.

Details of step S201 to step S206 are previously illustrated. Thus, they are omitted here. In the image color brightness compensation system 100, since the at least one matrix is introduced to the demosaic image data for compensating colors, images corresponding to the brightness compensated image data have true and natural colors. Further, to avoid brightness distortion, the pixel-based brightness compensation or the frame-based brightness compensation can be introduced to the image color brightness compensation system 100 for optimizing brightness of displayed images.

To sum up, the present invention illustrates an image color brightness compensation method and an image color brightness compensation system. The image color brightness compensation system is capable of compensating image colors and optimizing image brightness. Further, the color brightness compensation system can use at least one customized matrix for adjusting image colors in an intermediate brightness interval, a high brightness interval, and/or a low brightness interval. Further, to avoid brightness distortion, the pixel-based brightness compensation or the frame-based brightness compensation can be introduced to the image color brightness compensation system for optimizing brightness of displayed images. Therefore, distortions of colors and brightness of the displayed images of the color and brightness compensation system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image color brightness compensation method comprising:
   generating image data of a plurality of pixels by using a Bayer color filter of an image sensing unit;
   generating demosaic image data after the image data of the plurality of pixels is processed by a demosaic process;
   executing a linear combination process of the demosaic image data by using at least one matrix for generating output image data;
   processing the output image data by using a blending unit for generating blended image data;
   generating a brightness compensation gain of the blended image data; and
   compensating image brightness of the blending image data for generating brightness compensated image data according to the brightness compensation gain;
   wherein the image data of the plurality of pixels, the demosaic image data, the output image data, the blended image data, and the brightness compensated image data comprise red light data, green light data, blue light data, and infrared light data.

2. The method of claim 1, further comprising:
   generating a weighting signal for controlling the blending unit to execute a blending process of the output image data;
   wherein the weighting signal relates to an infrared light value, or relates to a maximum value of a red light value, a green light value, and a blue light value of the demosaic image data.

3. The method of claim 1, further comprising:
   generating a weighting signal for controlling the blending unit to execute a blending process of the output image data;
   wherein the weighting signal is generated according to a query table.

4. The method of claim 1, wherein processing the output image data by using the blending unit for generating blended image data comprises:
   executing a linear combination process to the output image data by using the blending unit for generating the blended image data after the output image data is generated by using the at least one matrix.

5. The method of claim 1, further comprising:
   detecting first brightness corresponding to the demosaic image data;
   detecting second brightness corresponding to blended image data; and
   generating the brightness compensation gain of the blended image data according to the first brightness and the second brightness.

6. The method of claim 5, wherein the brightness compensation gain is used for compensating each pixel of the plurality of pixels, or is used for compensating an image formed by the plurality of pixels.

7. The method of claim 1, wherein the at least one matrix comprises a first matrix and a second matrix, after the demosaic image data is generated by using the Bayer color filter and the demosaic process, the first matrix is used for compensating colors of pixels in an intermediate brightness interval, and the second matrix is used for compensating colors of pixels in a high brightness interval or a low brightness interval.

8. The method of claim 1, wherein average brightness of pixels corresponding to the demosaic image data is substantially equal to average brightness of pixels corresponding to the brightness compensated image data.

9. An image color brightness compensation system comprising:
- an image sensing unit having a Bayer color filter and configured to generate image data of a plurality of pixels;
- an image processing unit coupled to the image sensing unit and configured to generate demosaic image data by using a demosaic process;
- at least one matrix operation unit coupled to the image processing unit;
- a blending unit coupled to the at least one matrix operation unit; and
- a brightness compensation unit coupled to the blending unit;
- wherein after the demosaic image data is generated, the at least one matrix operation unit executes a linear combination process of the demosaic image data by using at least one matrix for generating output image data, the blending unit processes the output image data for generating blended image data and a brightness compensation gain of the blended image data, the brightness compensation unit compensates image brightness of the blending image data for generating brightness compensated image data according to the brightness compensation gain, and the image data of the plurality of pixels, the demosaic image data, the output image data, the blended image data, and the brightness compensated image data comprise red light data, green light data, blue light data, and infrared light data.

10. The system of claim 9, further comprising:
- an indicating unit coupled the blending unit and the image processing unit and configured to generate a weighting signal for controlling the blending unit to execute a blending process of the output image data;
- wherein the weighting signal relates to an infrared light value, or relates to a maximum value of a red light value, a green light value, and a blue light value of the demosaic image data.

11. The system of claim 9, further comprising:
- an indicating unit coupled the blending unit and the image processing unit and configured to generate a weighting signal for controlling the blending unit to execute a blending process of the output image data;
- wherein the weighting signal is generated according to a query table.

12. The system of claim 9, wherein the blending unit executes a linear combination process to the output image data for generating the blended image data after the output image data is generated by using the at least one matrix.

13. The system of claim 9, further comprising:
- a brightness compensation detection unit coupled to the blending unit, the brightness compensation unit, and the image processing unit;
- wherein the brightness compensation detection unit is used for detecting first brightness corresponding to the demosaic image data, detecting second brightness corresponding to blended image data, and generating the brightness compensation gain of the blended image data according to the first brightness and the second brightness.

14. The system of claim 13, wherein the brightness compensation gain is used for compensating each pixel of the plurality of pixels, or is used for compensating an image formed by the plurality of pixels.

15. The system of claim 9, wherein the at least one matrix comprises a first matrix and a second matrix, after the demosaic image data is generated by using the Bayer color filter and the demosaic process, the first matrix is used for compensating colors of pixels in an intermediate brightness interval, and the second matrix is used for compensating colors of pixels in a high brightness interval or a low brightness interval.

16. The system of claim 9, wherein average brightness of pixels corresponding to the demosaic image data is substantially equal to average brightness of pixels corresponding to the brightness compensated image data.

* * * * *